(12) United States Patent
Teng

(10) Patent No.: US 6,964,477 B1
(45) Date of Patent: Nov. 15, 2005

(54) MECHANISM FOR FASTENING LENSES TO EYEGLASS FRAME

(75) Inventor: Wei-Che Teng, Wan Lee Tainan (TW)

(73) Assignee: Irene Corporation, Wan Lee Tainan (TW)

( * ) Notice: Subject to any disclaimer, the term of this patent is extended or adjusted under 35 U.S.C. 154(b) by 0 days.

(21) Appl. No.: 10/907,691

(22) Filed: Apr. 12, 2005

(51) Int. Cl.[7] ............................................. G02C 1/00
(52) U.S. Cl. ........................... 351/86; 351/83; 351/106
(58) Field of Search ......................... 351/86, 83, 106, 351/103, 2, 90, 41

(56) References Cited

U.S. PATENT DOCUMENTS

| | | | | |
|---|---|---|---|---|
| 2,529,110 A | * | 11/1950 | Splaine | 351/60 |
| 3,233,249 A | * | 2/1966 | Baratelli et al. | 2/443 |
| 5,796,460 A | * | 8/1998 | Maturaporn | 351/86 |
| 6,460,996 B2 | * | 10/2002 | Okui et al. | 351/86 |
| 6,709,098 B1 | * | 3/2004 | Wang Lee | 351/86 |
| 6,742,890 B1 | * | 6/2004 | Teng | 351/86 |

* cited by examiner

Primary Examiner—Hung Xuan Dang
(74) Attorney, Agent, or Firm—Alan D. Kamrath; Nikolai & Mersereau, P.A.

(57) ABSTRACT

The present invention relates to a pair of eyeglasses comprising a pair of temples; a frame comprising two forward peripheral grooves either including two spaced first tabs at a nosepad portion of the frame, and a second tab at an endpiece portion of the frame; and a pair of lenses either comprising two spaced first apertures at its inner side and a second aperture at its outer side. The first apertures are adapted to lockingly engage with the first tabs and the second apertures are adapted to lockingly engage with the second tabs respectively in response to snapping the lenses onto the grooves. The assembly or disassembly of the lenses is fast and easy.

1 Claim, 4 Drawing Sheets

MECHANISM FOR FASTENING LENSES TO EYEGLASS FRAME

BACKGROUND OF THE INVENTION

1. Field of Invention

The present invention relates to eyeglass lens fastening devices and more particularly to an improved mechanism for fastening lenses to an eyeglass frame.

2. Related Art

A conventional mechanism for fastening an integral lens 20 to a temple 110 of a pair of sunglasses 10 is shown in FIG. 4. The lens 20 comprises at its either half portion a first recess 210 at an endpiece and a second recess 220 in an intermediate portion between the endpiece and a bridge along an upper edge of the lens 20. The temple 110 comprises a butt-strap 120 including a lengthwise groove 121 having a tab 123 proximate an opening of the groove 121 and a protrusion 122 proximate a blind end of the groove 121.

In assembly, snap the groove 121 of either temple 1 onto the endpiece until the tab 123 is lockingly engaged with the second recess 220 and the protrusion 122 is lockingly engaged with the first recess 210 respectively.

However, such prior mechanism is relatively complex in constructions and unreliable in use. Thus, the need for improvement still exists.

SUMMARY OF THE INVENTION

It is therefore an object of the present invention to provide a pair of eyeglasses comprising a pair of temples; a frame comprising two forward peripheral grooves either including two spaced first tabs at a nosepad portion of the frame, and a second tab at an endpiece portion of the frame; and a pair of lenses either comprising two spaced first apertures at its inner side and a second aperture at its outer side; wherein the first apertures are adapted to lockingly engage with the first tabs and the second apertures are adapted to lockingly engage with the second tabs respectively in response to snapping the lenses onto the grooves.

The above and other objects, features and advantages of the present invention will become apparent from the following detailed description taken with the accompanying drawings.

DETAILED DESCRIPTION OF THE INVENTION

Figure 1:
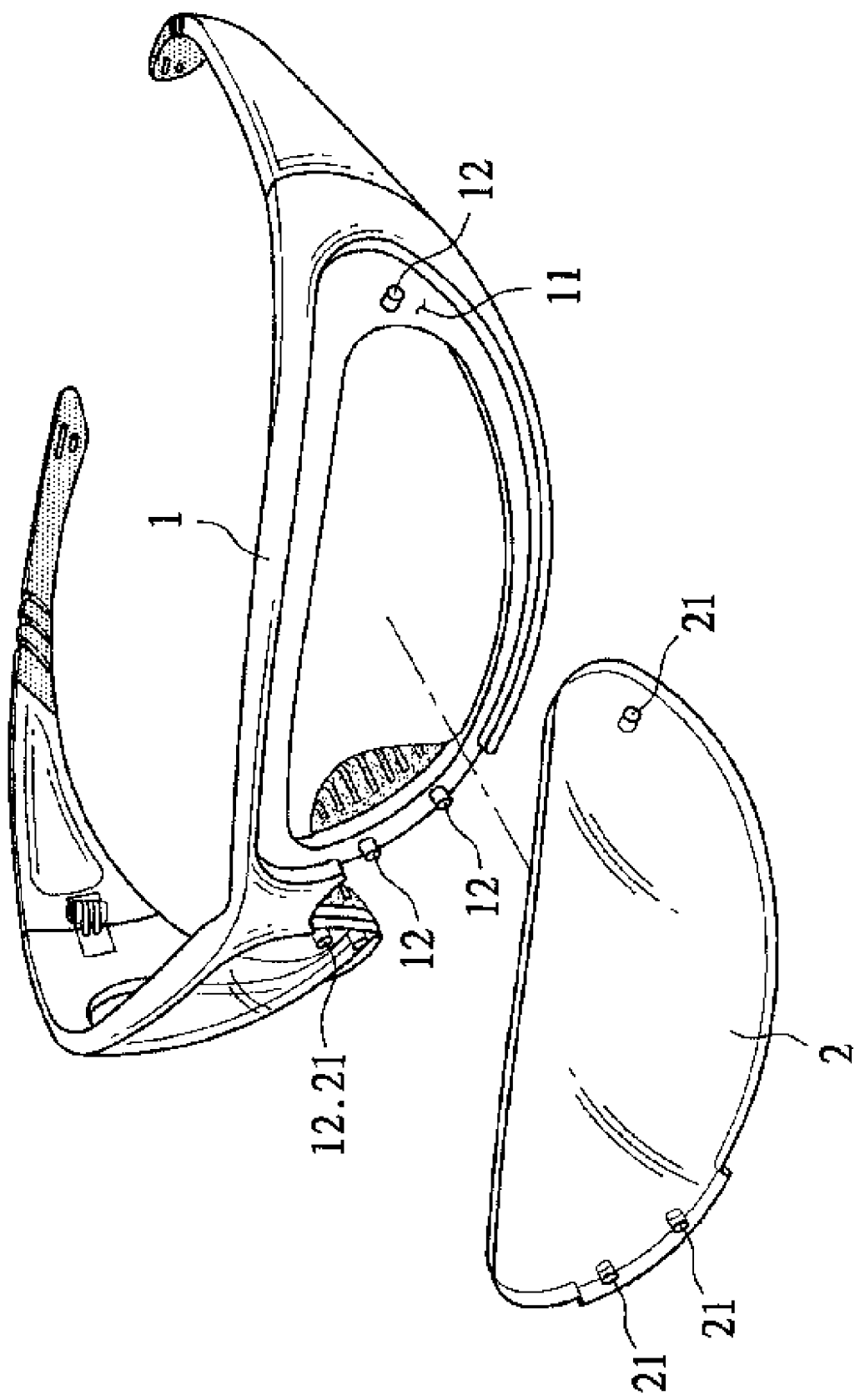
FIG. 1 is an exploded perspective view of a preferred embodiment of a pair of eyeglasses for showing a mechanism for fastening lenses to a frame according to the invention.
Figure 2:
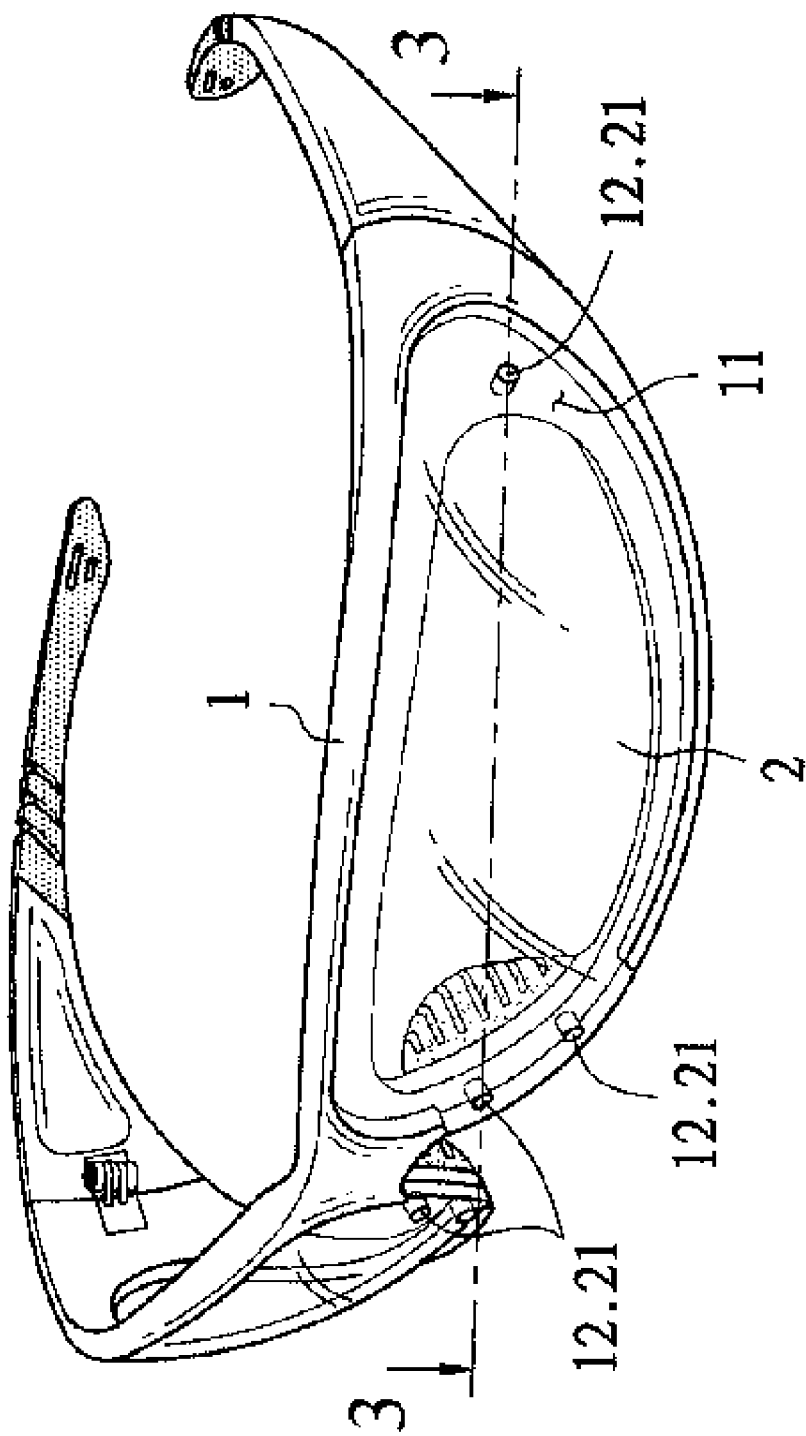
FIG. 2 is a perspective view of the assembled eyeglasses.
Figure 3:
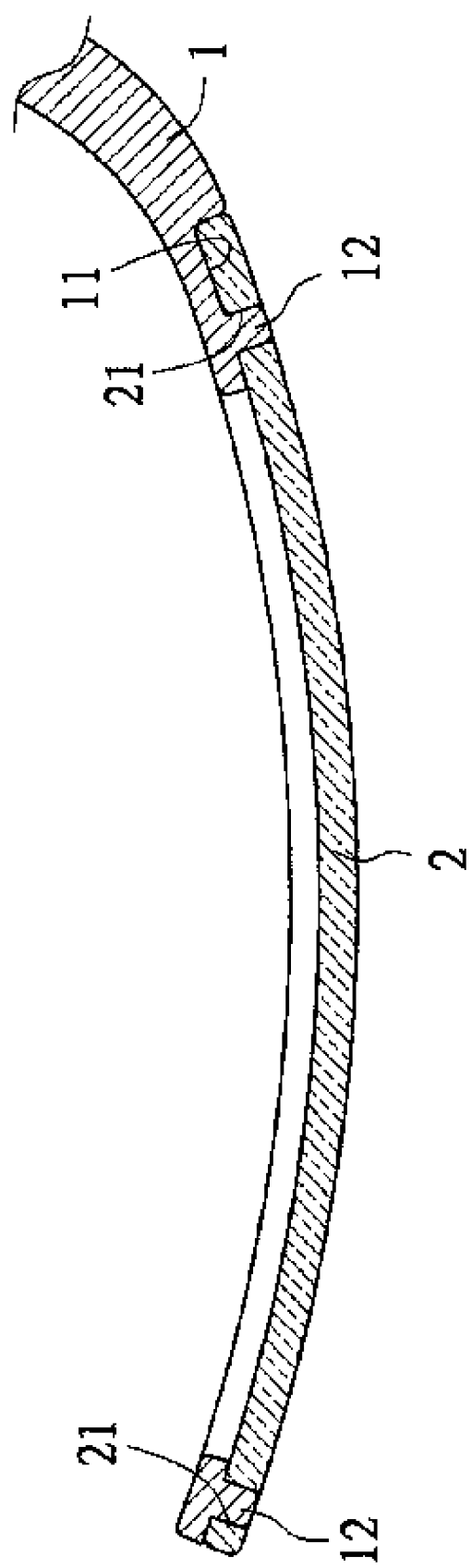
FIG. 3 is a sectional view taken along line 3—3 of FIG. 2.
Figure 4:
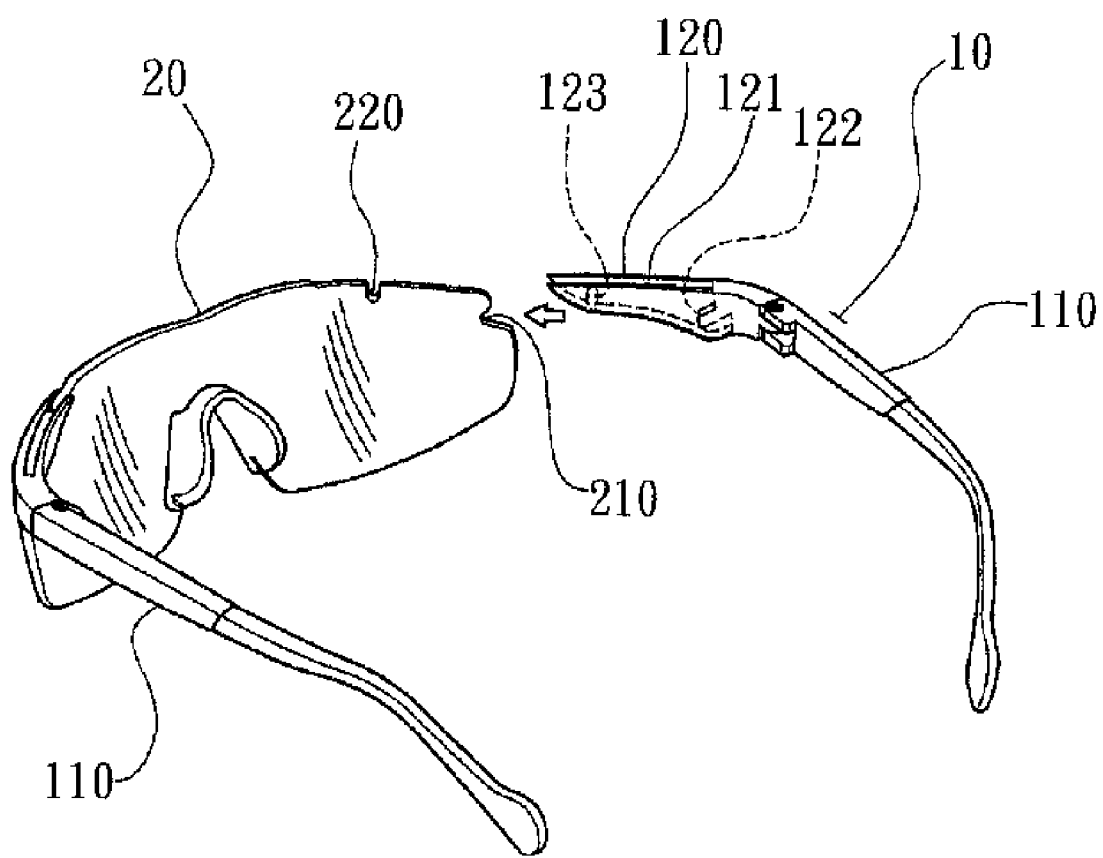
FIG. 4 is an exploded perspective view of sunglasses having a conventional mechanism for fastening lenses to temples.

Referring to FIGS. 1 to 3, a pair of eyeglasses (e.g., sunglasses) constructed in accordance with a preferred embodiment of the invention comprise a frame 1 and a pair of lenses 2. Either lens fitting portion of the eyeglass frame 1 is formed as a peripheral groove 11. On the groove 11 there are provided two spaced first tabs 12 at a nosepad portion of the frame 1 and a second tab 12 at an endpiece portion of the frame 1. Correspondingly, two spaced first apertures 21 are formed at an inner side of either lens 2 and a second aperture 21 is formed at an outer side of either lens 2.

In assembly, simply snap the lenses 2 onto the grooves 11 with the first apertures 21 tightly put on the first tabs 12 and the second aperture 21 tightly put on the second tab 12 respectively. The assembled lenses 2 and the frame 1 are thus fastened. For detaching the lenses 2, simply pull the lenses 2 to disengage the apertures 21 with the tabs 12. In view of the above, the assembly or disassembly of the lenses is very fast and easy. Moreover, the assembled lenses are reliably secured to the frame.

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses comprising:
   a pair of temples;
   a frame comprising two forward peripheral grooves either including two spaced first tabs at a nosepad portion of the frame, and a second tab at an endpiece portion of the frame; and
   a pair of lenses either comprising two spaced first apertures at its inner side and a second aperture at its outer side;
   wherein the first apertures are adapted to lockingly engaged with the first tabs and the second apertures are adapted to lockingly engaged with the second tabs respectively in response to snapping the lenses onto the grooves.

* * * * *